(12) United States Patent
Cao

(10) Patent No.: US 8,803,440 B2
(45) Date of Patent: Aug. 12, 2014

(54) LED BACKLIGHT DRIVING CIRCUIT AND LCD DEVICE

(71) Applicant: Shenzhen China Star Optoelectronics Technology Co., Ltd, Shenzhen (CN)

(72) Inventor: Dan Cao, Shenzhen (CN)

(*) Notice: Subject to any disclaimer, the term of this patent is extended or adjusted under 35 U.S.C. 154(b) by 0 days.

(21) Appl. No.: 13/809,507

(22) PCT Filed: Dec. 24, 2012

(86) PCT No.: PCT/CN2012/087244
§ 371 (c)(1),
(2), (4) Date: Jan. 10, 2013

(87) PCT Pub. No.: WO2014/094316
PCT Pub. Date: Jun. 26, 2014

(65) Prior Publication Data
US 2014/0176855 A1    Jun. 26, 2014

(30) Foreign Application Priority Data

Dec. 20, 2012 (CN) .......................... 2012 1 0558874

(51) Int. Cl.
*H05B 37/02* (2006.01)
*G02F 1/1335* (2006.01)
*H05B 33/08* (2006.01)

(52) U.S. Cl.
CPC ...... *G02F 1/133603* (2013.01); *H05B 33/0815* (2013.01)
USPC .......................................... 315/291; 315/224

(58) Field of Classification Search
USPC ............. 315/209 R, 224–226, 291, 294, 307, 315/308, 312; 345/82, 102, 690
See application file for complete search history.

(56) References Cited

U.S. PATENT DOCUMENTS 7,952,290 B2 * 5/2011 Huang ........................... 315/77

FOREIGN PATENT DOCUMENTS

| CN | 201733499 U | 2/2011 |
| CN | 202085347 U | 12/2011 |
| CN | 102682721 A | 9/2012 |
| JP | 4942087 B2 | 3/2012 |

OTHER PUBLICATIONS

Yan Yanwan, the International Searching Authority written comments, Sep. 2013, CN.

* cited by examiner

*Primary Examiner* — Jimmy Vu

(57) ABSTRACT

A light emitting diode (LED) backlight driving circuit includes a power supply module. A controllable switch and a voltage dividing resistor module are successively connected in series between an output end of the power supply module and a grounding end of the LED backlight driving circuit. A control end of the controllable switch is coupled with a power management chip. The LED backlight driving circuit further includes a first resistor and a current regulation module, an output current of the current regulation module is regulable. One end of the first resistor is connected between the controllable switch and the voltage dividing resistor module, and another end of the first resistor is connected with a first reference voltage, the first reference voltage is constant. An output end of the current regulation module is coupled between the first resistor and the first reference voltage. In summary, brightness regulation of the LED lightbar may be independently accomplished without use of the power management chip.

18 Claims, 1 Drawing Sheet

LED BACKLIGHT DRIVING CIRCUIT AND LCD DEVICE

TECHNICAL FIELD

The present disclosure relates to the field of liquid crystal displays (LCDs), and more particularly to a light emitting diode (LED) backlight driving circuit and an LCD device.

BACKGROUND

In a typical liquid crystal display (LCD) device, light emitting diodes (LEDs) are used as backlight sources. A plurality of LEDs are connected in series to form an LED lightbar. Then, the LED lightbar is driven by a special power management module to illuminate. The power management module includes a power management chip. Some power management chips have a pulse width modulation (PWM) dimming function, namely the power management chips can control brightness of the LED lightbar by controlling an effective current value of the LED lightbar. However, some power management chips do not have the PWM dimming function, resulting in that the power management chips and dimming function may not be simultaneously achieved.

SUMMARY

The aim of the present disclosure is to provide a light emitting diode (LED) backlight driving circuit and a light crystal display (LCD) device capable of achieving a dimming function without use of a power management chip.

The aim of the present disclosure is achieved by the following technical scheme.

An LED backlight driving circuit comprises a power supply module. A controllable switch and a voltage dividing resistor module are successively connected in series between an output end of the power supply module and a grounding end of the LED backlight driving circuit. A control end of the controllable switch is coupled with a power management chip. The LED backlight driving circuit further comprises a first resistor and a current regulation module, where an output current of the current regulation module is regulable. One end of the first resistor is connected between the controllable switch and the voltage dividing resistor module, and another end of the first resistor is connected with a first reference voltage, the first reference voltage is constant. An output end of the current regulation module is coupled between the first resistor and the first reference voltage.

Furthermore, the current regulation module comprises a photocoupler. The photocoupler comprises a control assembly having luminescent material and a switch assembly regulating an output current of the photocoupler according to light intensity of the control assembly. One end of the switch assembly is coupled with a second reference voltage, and another end of the switch assembly is coupled to the first resistor. The control assembly of the photocoupler is coupled with a voltage regulation unit having a regulable voltage. This is a circuit which realizes current regulation through the photocoupler. The current flowing through the switch assembly varies according to change of the voltage of the control assembly. Thus, current regulation function is realized. The switch assembly and the control assembly of the photocoupler are electrically isolated. The circuit of the switch assembly and the circuit of the control assembly do not affect each other, with high safety.

Furthermore, the voltage regulation unit comprises a pulse width modulation (PWM) assembly. An anode of the PWM assembly is connected with a second resistor. The control assembly of the photocoupler is connected in series between the second resistor and a cathode of the PWM assembly. The control assembly of the photocoupler is connected with a first capacitor in parallel. This is a circuit which realizes voltage regulation through the PWM. After the output voltage of the PWM assembly is filtered by the second resistor and the first capacitor, a voltage of an input end of the control assembly of the photocoupler is almost equal to a voltage difference between the anode and the cathode of the PWM assembly. Thus, the voltage of the control assembly of the photocoupler is equal to the voltage difference between the anode and the cathode of the PWM assembly multiplied by a duty. As long as the duty is regulated, different voltages of the control assembly of the photocoupler are obtained. Accordingly, different currents of the switch assembly are obtained.

Furthermore, a third resistor is connected in series between the cathode of the PWM assembly and the grounding end of the LED backlight driving circuit. A harmonic wave of the control assembly may be transmitted into the grounding end through the third resistor.

Furthermore, a fourth resistor is connected in series between the switch assembly of the photocoupler and the first resistor. The fourth resistor limits a current of the switch assembly, thus avoiding damaging the first resistor by overcurrent.

Furthermore, a fifth resistor is connected in series between the second reference voltage and the switch assembly of the photocoupler. The fifth resistor limits the current of the switch assembly, thus avoiding damaging the first resistor by overcurrent.

Furthermore, the current regulation module further comprises a voltage stabilization diode. A cathode of the voltage stabilization diode is connected to one end of the fifth resistor being adjacent to the switch assembly of the photocoupler. An anode of the voltage stabilization diode is connected to the grounding end of the LED backlight driving circuit. An excitation end of the voltage stabilization diode is coupled to the cathode. The voltage stabilization diode may stabilize an output voltage of the second reference voltage, and then stabilize the output current, thus improving control accuracy.

Furthermore, the current regulation module comprises a photocoupler and a voltage stabilization diode. One end of the switch assembly of the photocoupler is successively connected with a fifth resistor and a second reference voltage in series, and another end of the switch assembly is coupled to the first resistor through a fourth resistor. A cathode of the voltage stabilization diode is connected to one end of the fifth resistor being adjacent to the switch assembly of the photocoupler. An anode of the voltage stabilization diode is connected to the grounding end of the LED backlight driving circuit. An excitation end of the voltage stabilization diode is coupled to the cathode.

The control assembly of the photocoupler is coupled with a voltage regulation unit having a regulable voltage. The voltage regulation unit comprises a PWM assembly. An anode of the PWM assembly is connected with a second resistor. The control assembly of the photocoupler is connected in series between the second resistor and a cathode of the PWM assembly. The control assembly of the photocoupler is connected with a first capacitor in parallel. A third resistor is connected in series between the cathode of the PWM assembly and the grounding end of the LED backlight driving circuit. The voltage dividing resistor module comprises a sixth resistor and a seventh resistor which are connected in parallel. This is a specific structure of the LED backlight driving circuit.

Furthermore, the power management chip comprises a protection pin having a constant voltage. The first resistor is coupled to the protection pin. A second capacitor is connected in series between the protection pin and the grounding end of the LED backlight driving circuit. A power end of the power management chip is coupled to the fifth resistor.

The protection pin provides the first reference voltage. The power end of the power management chip provides the second reference voltage. The first reference voltage and the second reference voltage are obtained from the power management chip. The circuit structure may be simplified, which improves circuit reusability and reduces costs.

An LCD device comprises an LED backlight driving circuit of the present disclosure.

The current regulation module can regulate current and is adopted in the present disclosure. When the output current of the current regulation module increases, current flowing via the first resistor increases. Accordingly, the voltage of the first resistor increases. However, the first reference voltage is constant and is equal to the sum of the voltage of the first resistor and the voltage of the voltage dividing resistor module. Thus, the voltage of the first resistor increases, the voltage of the voltage dividing resistor module decreases, and the current flowing via the voltage dividing resistor module decreases. Because the voltage dividing resistor module is connected in series between the output end of a power supply module and the grounding end of the LED backlight driving circuit, decrease of the current of the current module means that the current of the power supply module decreases and brightness of the LED lightbar is reduced. In constrast, when the output current of the current regulation module decreases, the brightness of the LED lightbar is increased. In summary, brightness regulation of the LED lightbar may be independently accomplished without use of the power management chip.

Legends: 1. power supply module; 2. controllable switch; 3. power management chip; 4. voltage dividing resistor module; 5. first resistor; 6. current regulation module; 7. light emitting diode (LED) lightbar; 8. voltage regulation unit; 9. pulse width modulation (PWM) assembly; 10. protection pin; 11. switch assembly; 12. control assembly.

DETAILED DESCRIPTION

Figure 1:
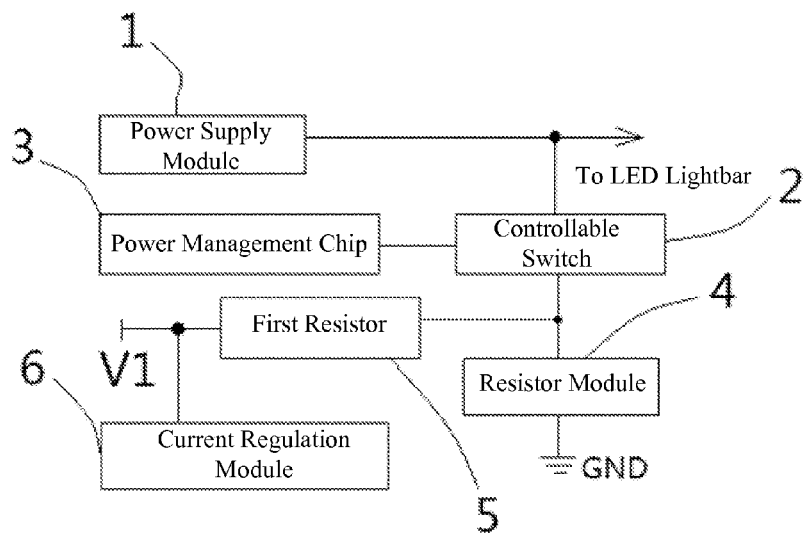
FIG. 1 is a schematic diagram of the present disclosure.

The present disclosure discloses a liquid crystal display (LCD) device. The LCD device comprises a light emitting diode (LED) backlight driving circuit. As shown in FIG. 1, the LED backlight driving circuit comprises a power supply module 1. A controllable switch 2 and a voltage dividing resistor module 4 are successively connected in series between an output end of the power supply module 1 and a grounding end of the LED backlight driving circuit. A control end of the controllable switch is coupled with a power management chip 3. The LED backlight driving circuit further comprises a first resistor 5. One end of the first resistor 5 is connected between the controllable switch 2 and the voltage dividing resistor module 4, and another end of the first resistor 5 is connected with a first reference voltage V1 and a current regulation module 6. The first reference voltage V1 is constant and an output current of the current regulation module 6 is regulable.

The current regulation module can regulate current and is adopted in the present disclosure. When the output current of the current regulation module increases, current flowing via the first resistor increases. Accordingly, a voltage of the first resistor increases. However, the first reference voltage is constant and is equal to a sum of the voltage of the first resistor and a voltage of the voltage dividing resistor module. Thus, the voltage of the first resistor increases, the voltage of the voltage dividing resistor module decreases, and current flowing via the voltage dividing resistor module decreases. Because the voltage dividing resistor module is connected in series between the output end of a power supply module and the grounding end of the LED backlight driving circuit, decrease of the current of the voltage dividing resistor module means that current of the power supply module decreases and brightness of the LED lightbar is reduced. In contrast, when the output current of the current regulation module decreases, brightness of the LED lightbar is increased. In summary, brightness regulation of the LED lightbar may be independently accomplished without use of the power management chip.

The present disclosure is further described in detail in accordance with the figures and the exemplary examples.

Figure 2:
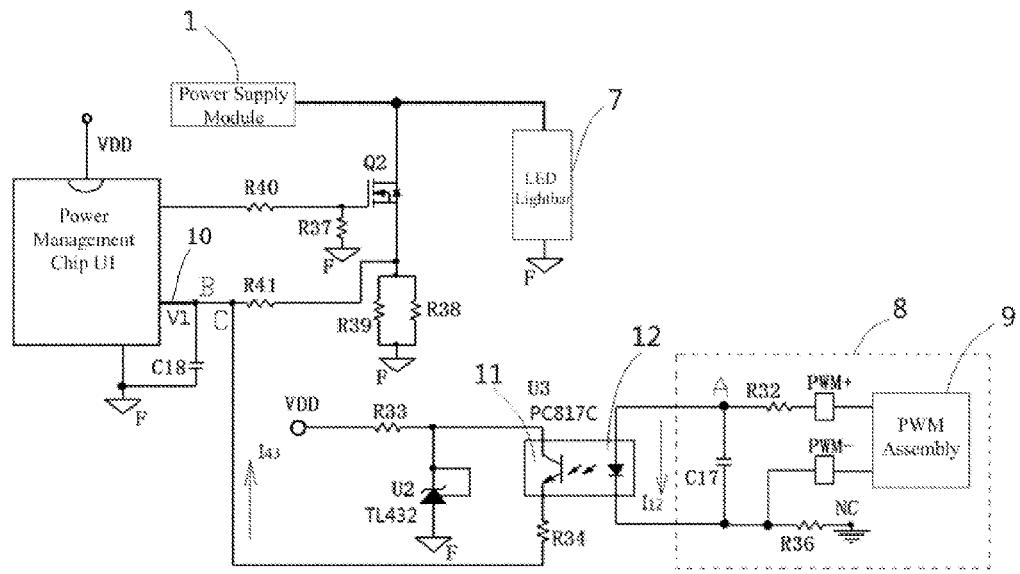
FIG. 2 is a schematic diagram of an example of the present disclosure.

As shown in FIG. 2, the LED backlight driving circuit comprises a power supply module 1 and a power management chip U1. An output end of the power supply module 1 is connected with an LED lightbar 7. A controllable switch Q2 and a voltage dividing resistor module are successively connected in series between the output end of the power supply module 1 and a grounding end F of the LED backlight driving circuit. The power management chip U1 is coupled to a control end of the controllable switch Q2 through an eighth resistor R40. A ninth resistor R37 is also connected in series between the control end of the controllable switch Q2 and the grounding end of the LED backlight driving circuit.

The LED backlight driving circuit further comprises a first resistor R41. One end of the first resistor R41 is connected between the controllable switch Q2 and the voltage dividing resistor module, and another end of the first resistor R41 is connected with a first reference voltage V1 and a current regulation module, and the first reference voltage V1 is constant, an output current of the current regulation module is regulable.

The current regulation module comprises a photocoupler U3 and a voltage stabilization diode U2. The photocoupler comprises a control assembly 12 having luminescent material, and a switch assembly 11 regulating an output current of the photocoupler according to light intensity of the control assembly 12. One end of the switch assembly 11 is successively connected with a fifth resistor R33 and a second reference voltage VDD in series, and another end of the switch assembly 11 is coupled to the first resistor R41 through a fourth resistor R34. A cathode of the voltage stabilization diode U2 is connected to one end of the fifth resistor R33 being adjacent to the switch assembly 11 of the photocoupler U3. An anode of the voltage stabilization diode U2 is connected to the grounding end of the LED backlight driving circuit. An excitation end of the voltage stabilization diode is coupled to the cathode.

The control assembly 12 of the photocoupler U3 is coupled with a voltage regulation unit 8 having a regulable voltage. The voltage regulation unit 8 comprises a pulse width modulation (PWM) assembly 9. An anode of the PWM assembly 9 is connected with a second resistor R32. The control assembly 12 of the photocoupler U3 is connected in series between the second resistor R32 and a cathode of the PWM assembly 9. The control assembly 12 of the photocoupler U3 is connected with a first capacitor C17 in parallel. A third resistor R36 is connected in series between the cathode of the PWM assembly 9 and the grounding end of the LED backlight driving circuit. A harmonic wave of the control assembly 12 may be transmitted into the grounding end through the third resistor R36. The harmonic wave of the control assembly 12 may be transmitted into the grounding end through the fourth resistor R34 and the fifth resistor R33. The voltage stabilization diode U2 may stabilize an output voltage of the second reference voltage VDD, and then stabilize the output current, thus improving control accuracy.

The power management chip U1 comprises a protection pin 10 having a constant voltage. The first resistor R41 is coupled to the protection pin 10. A second capacitor C18 is connected in series between the protection pin 10 and the grounding end of the LED backlight driving circuit. A power end of the power management chip U1 is coupled to the fifth resistor R33. The protection pin 10 provides the first reference voltage V1. The power end of the power management chip U1 provides the second reference voltage VDD.

The example is a circuit realizing voltage regulation through the PWM. The current flowing through the switch assembly 11 varies according to change of the voltage of the control assembly 12 of the photocoupler U3. Thus, current regulation function is realized. The switch assembly 11 of the photocoupler U3 and the control assembly 12 of the photocoupler U3 are electrically isolated. The circuit of the switch assembly 11 and the circuit of the control assembly 12 do not affect each other, with high safety. After the output voltage of the PWM assembly 9 is filtered by the second resistor R32 and the first capacitor C17, a voltage of an input end of the control assembly 12 of the photocoupler U3 is almost equal to a voltage difference between the anode and the cathode of the PWM assembly 9. Thus, the voltage of the control assembly 12 of the photocoupler U3 is equal to the voltage difference between the anode and the cathode of the PWM assembly 9 multiplied by a duty. As long as the duty is regulated, different voltages of the control assembly 12 of the photocoupler U3 are obtained. Accordingly, different currents of the switch assembly 11 are obtained. Optionally, other regulation modes may also be used in the present disclosure. For example, a resistor voltage regulation device is connected with the control assembly 12 of the photocoupler. Voltages of two ends of the control assembly 12 of the photocoupler may also be changed. Then, a current of the switch assembly 11 of the photocoupler is regulated to achieve purpose of regulating brightness of the LED lightbar. Furthermore, the photocoupler may not be used in the present disclosure. An output end of a switch power supply having regulable output current is connected to the first resistor. The current flowing through the first resistor may be changed to achieve dimming of the LED lightbar.

PWM signals are sent to PWM+ port and PWM− port of the PWM assembly 9. After filtering by the second resistor R32 and the first capacitor C17, voltages at point A (the voltages of two ends of the control assembly 12 of the photocoupler) are close to the voltage between the anode and the cathode of the PWM assembly 9. Thus, VA (the voltages at point A)=$V_{PWM}$*duty, so that different duties correspond to different voltages at point A, namely that currents I12 flowing through the control assembly 12 of the photocoupler U3 are also different. As the duty is increased, the corresponding current increases. Thus, the currents I43 flowing through the switch assembly 11 of the photocoupler U3 are also different (I43=n*I12, n is a current transmission ratio of the photocoupler. As the duty is increased, the corresponding I43 increases). The currents flowing through the first resistor R41 are also different. Thus, voltage drop across the first resistor R41 also varies (as the duty is increased, the voltage drop increases). The voltage (the voltage at point B) of the protection pin of the power management chip U1 is constant. Thus, as voltage drop across the resistor R41 is increased, the currents flowing through the controllable switch Q2, a sixth resistor R38, and a seventh resistor R39 decrease. As a result, the current flowing through the LED lightbar 7 decreases, and brightness is decreased. Finally, the brightness of the LED lightbar 7 corresponding to the largest duty of the PWM signals of the increased PWM assembly 9 is minimal, and the brightness of the LED lightbar 7 corresponding to the minimum duty is maximal. Then, the PWM dimming function is achieved.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

I claim:

1. A driving circuit for driving a light emitting diode (LED) backlight, comprising:
   a power supply module;
   a first resistor; and
   a current regulation module;
   wherein a controllable switch and a voltage dividing resistor module are successively connected in series between an output end of the power supply module and a grounding end of the LED backlight driving circuit, and a power management chip is coupled with a control end of the controllable switch;
   wherein one end of the first resistor is connected between the controllable switch and the voltage dividing resistor module, and another end of the first resistor is connected with a first reference voltage, and the first reference voltage is constant;
   wherein an output current of the current regulation module is regulable, and an output end of the current regulation module is coupled between the first resistor and the first reference voltage.

2. The driving circuit of claim 1, wherein the current regulation module comprises a photocoupler; the photocoupler comprises a control assembly having luminescent material, and a switch assembly regulating an output current of the photocoupler according to light intensity of the control assembly; one end of the switch assembly is coupled with a second reference voltage, and another end of the switch assembly is coupled to the first resistor; the control assembly of the photocoupler is coupled with a voltage regulation unit having a regulable voltage.

3. The driving circuit of claim 2, wherein the voltage regulation unit comprises a pulse width modulation (PWM) assembly, an anode of the PWM assembly is connected with a second resistor; the control assembly of the photocoupler is connected in series between the second resistor and a cathode of the PWM assembly; the control assembly of the photocoupler is connected with a first capacitor in parallel.

4. The driving circuit of claim 3, wherein a third resistor is connected in series between the cathode of the PWM assembly and the grounding end of the LED backlight driving circuit.

5. The driving circuit of claim 2, wherein a fourth resistor is connected in series between the switch assembly of the photocoupler and the first resistor.

6. The driving circuit of claim 2, wherein a fifth resistor is connected in series between the second reference voltage and the switch assembly of the photocoupler.

7. The driving circuit of claim 6, wherein the current regulation module further comprises a voltage stabilization diode; a cathode of the voltage stabilization diode is connected to one end of the fifth resistor being adjacent to the switch assembly of the photocoupler; an anode of the voltage stabilization diode is connected to the grounding end of the LED backlight driving circuit; an excitation end of the voltage stabilization diode is coupled to the cathode.

8. The driving circuit of claim 1, wherein the current regulation module comprises a photocoupler and a voltage stabilization diode; one end of the switch assembly of the photocoupler is successively connected with a fifth resistor and a second reference voltage in series, and another end of the switch assembly is coupled to the first resistor through a fourth resistor; a cathode of the voltage stabilization diode is connected to one end of the fifth resistor being adjacent to the switch assembly of the photocoupler; an anode of the voltage stabilization diode is connected to the grounding end of the LED backlight driving circuit; an excitation end of the voltage stabilization diode is coupled to the cathode, the control assembly of the photocoupler is coupled with a voltage regulation unit having a regulable voltage; the voltage regulation unit comprises a pulse width modulation (PWM) assembly; an anode of the PWM assembly is connected with a second resistor; the control assembly of the photocoupler is connected in series between the second resistor and a cathode of the PWM assembly; the control assembly of the photocoupler is connected with a first capacitor in parallel; a third resistor is connected in series between the cathode of the PWM assembly and the grounding end of the LED backlight driving circuit; the voltage dividing resistor module comprises a sixth resistor and a seventh resistor which are connected in parallel.

9. The driving circuit of claim 8, wherein the power management chip comprises a protection pin having a constant voltage; the first resistor is coupled to the protection pin; a second capacitor is connected in series between the protection pin and the grounding end of the LED backlight driving circuit; a power end of the power management chip is coupled to the fifth resistor;
the protection pin provides the first reference voltage; the power end of the power management chip provides the second reference voltage.

10. A light crystal display (LCD) device, comprising:
a driving circuit for driving a light emitting diode (LED) backlight;
wherein the driving circuit comprises a power supply module; a controllable switch and a voltage dividing resistor module are successively connected in series between an output end of the power supply module and a grounding end of the driving circuit; a control end of the controllable switch is coupled with a power management chip;
wherein the driving circuit further comprises a first resistor and a current regulation module, an output current of the current regulation module is regulable; one end of the first resistor is connected between the controllable switch and the voltage dividing resistor module, and another end of the first resistor is connected with a first reference voltage, the first reference voltage is constant; an output end of the current regulation module is coupled between the first resistor and the first reference voltage.

11. The liquid crystal display (LCD) device of claim 10, wherein the current regulation module comprises a photocoupler; the photocoupler comprises a control assembly having luminescent material, and a switch assembly regulating an output current of the photocoupler according to light intensity of the control assembly; one end of the switch assembly is coupled with a second reference voltage, and another end of the switch assembly is coupled to the first resistor; the control assembly of the photocoupler is coupled with a voltage regulation unit having a regulable voltage.

12. The liquid crystal display (LCD) device of claim 11, wherein the voltage regulation unit comprises a pulse width modulation (PWM) assembly; an anode of the PWM assembly is connected with a second resistor; the control assembly of the photocoupler is connected in series between the second resistor and a cathode of the PWM assembly; the control assembly of the photocoupler is connected with a first capacitor in parallel.

13. The liquid crystal display (LCD) device of claim 12, wherein a third resistor is connected in series between the cathode of the pulse width modulation (PWM) assembly and the grounding end of the driving circuit.

14. The liquid crystal display (LCD) device of claim 11, wherein a fourth resistor is connected in series between the switch assembly of the photocoupler and the first resistor.

15. The liquid crystal display (LCD) device of claim 11, wherein a fifth resistor is connected in series between the second reference voltage and the switch assembly of the photocoupler.

16. The liquid crystal display (LCD) device of claim 15, wherein the current regulation module further comprises a voltage stabilization diode; a cathode of the voltage stabilization diode is connected to one end of the fifth resistor being adjacent to the switch assembly of the photocoupler; the anode of the voltage stabilization diode is connected to the grounding end of the driving circuit; an excitation end of the voltage stabilization diode is coupled to the cathode.

17. The liquid crystal display (LCD) device of claim 10, wherein the current regulation module comprises a photocoupler and a voltage stabilization diode; one end of the switch assembly of the photocoupler is successively connected with a fifth resistor and a second reference voltage in series, and another end of the switch assembly is coupled to the first resistor through a fourth resistor; a cathode of the voltage stabilization diode is connected to one end of the fifth resistor being adjacent to the switch assembly of the photocoupler; an anode of the voltage stabilization diode is connected to the grounding end of the driving circuit; an excitation end of the voltage stabilization diode is coupled to the cathode;
the control assembly of the photocoupler is coupled with a voltage regulation unit having a regulable voltage; the voltage regulation unit comprises a pulse width modulation (PWM) assembly; an anode of the PWM assembly is connected with a second resistor; the control assembly of the photocoupler is connected in series between the second resistor and a cathode of the PWM assembly; the control assembly of the photocoupler is connected with a first capacitor in parallel; a third resistor is connected in series between the cathode of the PWM assembly and the grounding end of the driving circuit; the voltage dividing resistor module comprises a sixth resistor and a seventh resistor connected in parallel.

18. The liquid crystal display (LCD) device of claim 17, wherein the power management chip comprises a protection pin having a constant voltage; the first resistor is coupled to the protection pin; a second capacitor is connected in series between the protection pin and the grounding end of the driving circuit; a power end of the power management chip is coupled to the fifth resistor;

the protection pin provides the first reference voltage; the power end of the power management chip provides the second reference voltage.

* * * * *